United States Patent
Tripathi et al.

(10) Patent No.: US 7,697,434 B1
(45) Date of Patent: Apr. 13, 2010

(54) METHOD AND APPARATUS FOR ENFORCING RESOURCE UTILIZATION OF A CONTAINER

(75) Inventors: Sunay Tripathi, San Jose, CA (US); Nicolas G. Droux, San Jose, CA (US)

(73) Assignee: Sun Microsystems, Inc., Sanata Clara, CA (US)

( * ) Notice: Subject to any disclaimer, the term of this patent is extended or adjusted under 35 U.S.C. 154(b) by 1289 days.

(21) Appl. No.: 11/112,910

(22) Filed: Apr. 22, 2005

(51) Int. Cl.
*H04L 12/28* (2006.01)

(52) U.S. Cl. ........................ 370/235; 370/230; 370/396; 718/1

(58) Field of Classification Search ................. 370/235, 370/230, 396; 718/1
See application file for complete search history.

(56) References Cited

U.S. PATENT DOCUMENTS

| | | | |
|---|---|---|---|
| 6,041,053 A * | 3/2000 | Douceur et al. ............. 370/389 |
| 6,070,219 A * | 5/2000 | McAlpine et al. ........... 710/263 |
| 6,131,163 A | 10/2000 | Wiegel |
| 6,163,539 A | 12/2000 | Alexander et al. |
| 6,600,721 B2 | 7/2003 | Edholm |
| 6,757,731 B1 | 6/2004 | Barnes et al. |
| 6,829,217 B1 | 12/2004 | Bechtolsheim et al. |
| 6,831,893 B1 * | 12/2004 | Ben Nun et al. ............. 370/235 |
| 6,859,841 B2 | 2/2005 | Narad et al. |
| 6,944,168 B2 | 9/2005 | Paatela et al. |
| 7,046,665 B1 * | 5/2006 | Walrand et al. ............. 370/392 |
| 7,146,431 B2 | 12/2006 | Hipp et al. |
| 7,177,311 B1 | 2/2007 | Hussain et al. |
| 7,257,815 B2 | 8/2007 | Gbadegesin et al. |
| 7,260,102 B2 | 8/2007 | Mehrvar et al. |
| 7,313,142 B2 | 12/2007 | Matsuo et al. |
| 7,356,818 B2 * | 4/2008 | Carollo et al. .............. 718/102 |
| 2002/0052972 A1 | 5/2002 | Yim |
| 2003/0037154 A1 | 2/2003 | Poggio et al. |
| 2005/0135243 A1 * | 6/2005 | Lee et al. .................... 370/229 |
| 2005/0138620 A1 * | 6/2005 | Lewites ........................ 718/1 |
| 2006/0041667 A1 * | 2/2006 | Ahn et al. ................... 709/229 |
| 2006/0041741 A1 * | 2/2006 | Pohjolainen et al. ........ 713/150 |
| 2006/0070066 A1 * | 3/2006 | Grobman ....................... 718/1 |
| 2006/0174324 A1 * | 8/2006 | Zur et al. ....................... 726/3 |
| 2008/0123531 A1 * | 5/2008 | Gerkis ......................... 370/235 |
| 2008/0144635 A1 * | 6/2008 | Carollo et al. .............. 370/397 |

OTHER PUBLICATIONS

Dovrolis, et al, "HIP: Hybrid Interrupt-Polling for the Network Interface", ACM SIGOPS Operating Systems Review, vol. 35, Iss. 4, Oct. 2001, pp. 50-60.*

* cited by examiner

*Primary Examiner*—Ricky Ngo
*Assistant Examiner*—Luat Phung
(74) *Attorney, Agent, or Firm*—Osha • Liang LLP

(57) ABSTRACT

A method for controlling resource utilization of a container that includes associating the container with a virtual network stack, receiving a plurality of packets from a network, analyzing each of the plurality of packets by a classifier to determine to which of a plurality of temporary data structures each of the plurality of packet is forwarded, forwarding each of the plurality of packets to one of the plurality of temporary data structures as determined by the classifier, requesting at least one packet for the one of the plurality of temporary data structures by the virtual network stack, wherein the virtual network stack is associated with the one of the plurality of temporary data structures, and forwarding the at least one packet to the virtual network stack.

18 Claims, 7 Drawing Sheets

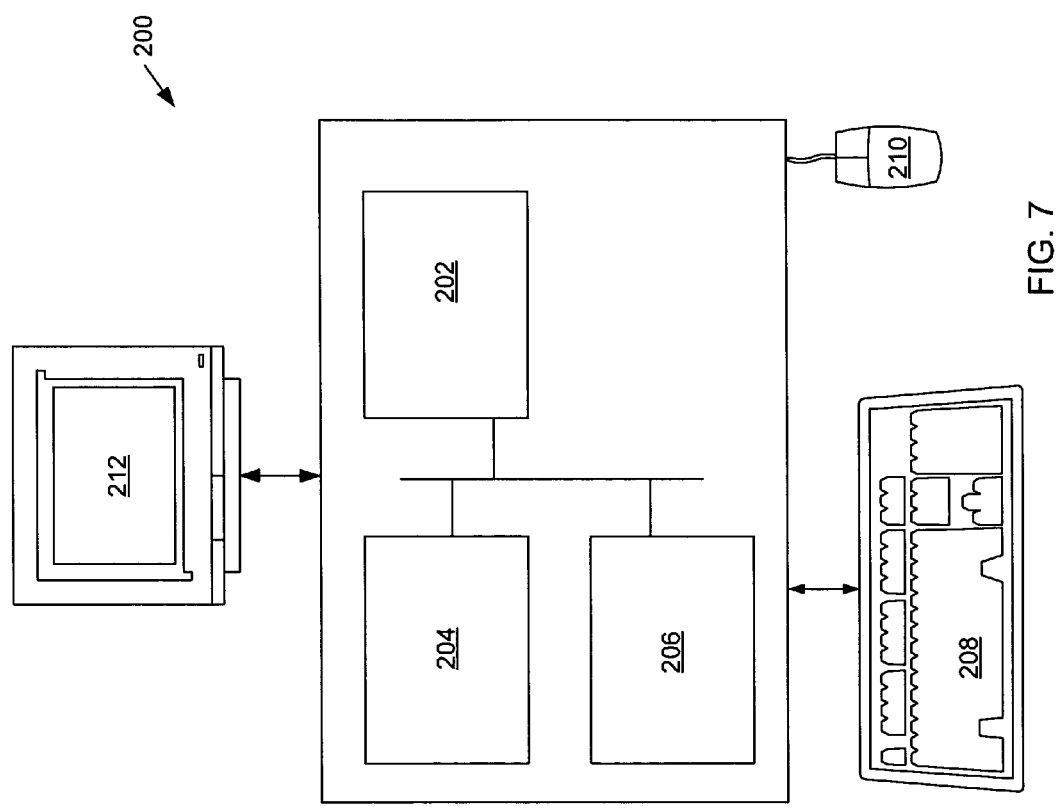

METHOD AND APPARATUS FOR ENFORCING RESOURCE UTILIZATION OF A CONTAINER

CROSS REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" Ser. No. 11/112,637; "Method and Apparatus for Consolidating Available Computing Resources on Different Computing Devices" Ser. No. 11/112,368; "Assigning Higher Priority to Transactions Based on Subscription Level" Ser. No. 11/112,947; "Method and Apparatus for Dynamically Isolating Affected Services Under Denial of Service Attack" Ser. No. 11/112,158; "Method and Apparatus for Improving User Experience for Legitimate Traffic of a Service Impacted by Denial of Service Attack" Ser. No. 11/112,629; "Method and Apparatus for Limiting Denial of Service Attack by Limiting Traffic for Hosts" Ser. No. 11/112,328; "Hardware-Based Network Interface Per-Ring Resource Accounting" Ser. No. 11/112,222; "Dynamic Hardware Classification Engine Updating for a Network Interface" Ser. No. 11/112,934; "Network Interface Card Resource Mapping to Virtual Network Interface Cards" Ser. No. 11/112,063; "Network Interface Decryption and Classification Technique" Ser. No. 11/112,436; "Method and Apparatus for Enforcing Packet. Destination Specific Priority Using Threads" Ser. No. 11/112,584; "Method and Apparatus for Processing Network Traffic Associated with Specific Protocols" Ser. No. 11/112,228; and "Method and Apparatus for Enforcing Bandwidth Utilization of a Virtual Serialization Queue" Ser. No. 11/112,322.

BACKGROUND

Network traffic is transmitted from a network, such as the Internet, from a sending system (e.g., a computer system) to a receiving system (e.g., a computer system) via a network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

Typically, the classifier includes a connection data structure that includes information about active connections on the receiving system. The connection data structure may include the following information about each active connection: (i) the queue associated with the connection; and (ii) information necessary to process the packets on the queue associated with the connection. Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

Once the classifier determines the connection associated with the packets, the packets are forwarded to a temporary data structure (e.g., a receive ring on the NIC) and an interrupt is issued to the CPU associated with the queue. In response to the interrupt, a thread associated with the CPU (to which the serialization queue is bound) retrieves the packets from the temporary data structure and places them in the appropriate queue. Once packets are placed in the queue, those packets are processed in due course. In some implementations, the queues are implemented such that only one thread is allowed to access a given queue at any given time.

SUMMARY

In general, in one aspect, the invention relates to a method for controlling resource utilization of a container that includes associating the container with a virtual network stack, receiving a plurality of packets from a network, analyzing each of the plurality of packets by a classifier to determine to which of a plurality of temporary data structures each of the plurality of packet is forwarded, forwarding each of the plurality of packets to one of the plurality of temporary data structures as determined by the classifier, requesting at least one packet for the one of the plurality of temporary data structures by the virtual network stack, wherein the virtual network stack is associated with the one of the plurality of temporary data structures, and forwarding the at least one packet to the virtual network stack.

In general, in one aspect, the invention relates to a system, comprising a network interface configured to receive a plurality of packets from a network, a classifier operatively connected to the network interface configured to analyze each of the plurality of packets and determine to which of a plurality of temporary data structures each of the plurality of packet is forwarded, the plurality of temporary data structures configured to receive packets from the classifier, wherein each of the plurality of temporary data structures is associated with at least one virtual network stack, and the at least one virtual network stack, wherein the at least one virtual network stack is associated with a container and configured to retrieve and queue a number of packets from the one of the plurality of temporary data structures associated with the at least one virtual network stack when the at least one virtual serialization queue is operating in polling mode.

In general, in one aspect, the invention relates to a computer readable medium comprising software instructions for controlling resource utilization of a container, comprising software instructions executable to associate the container with a virtual network stack, receive a plurality of packets from a network, analyze each of the plurality of packets by a classifier to determine to which of a plurality of temporary data structures each of the plurality of packet is forwarded, forward each of the plurality of packets to one of the plurality of temporary data structures as determined by the classifier, request at least one packet for the one of the plurality of temporary data structures by the virtual network stack, wherein the virtual network stack is associated with the one of the plurality of temporary data structures, and forward the at least one packet to the virtual network stack.

Other aspects of the invention will be apparent from the following description and the appended claims.

BRIEF DESCRIPTION OF DRAWINGS

FIG. 7 shows a computer system in accordance with one embodiment of the invention.

DETAILED DESCRIPTION

Figure 1A:
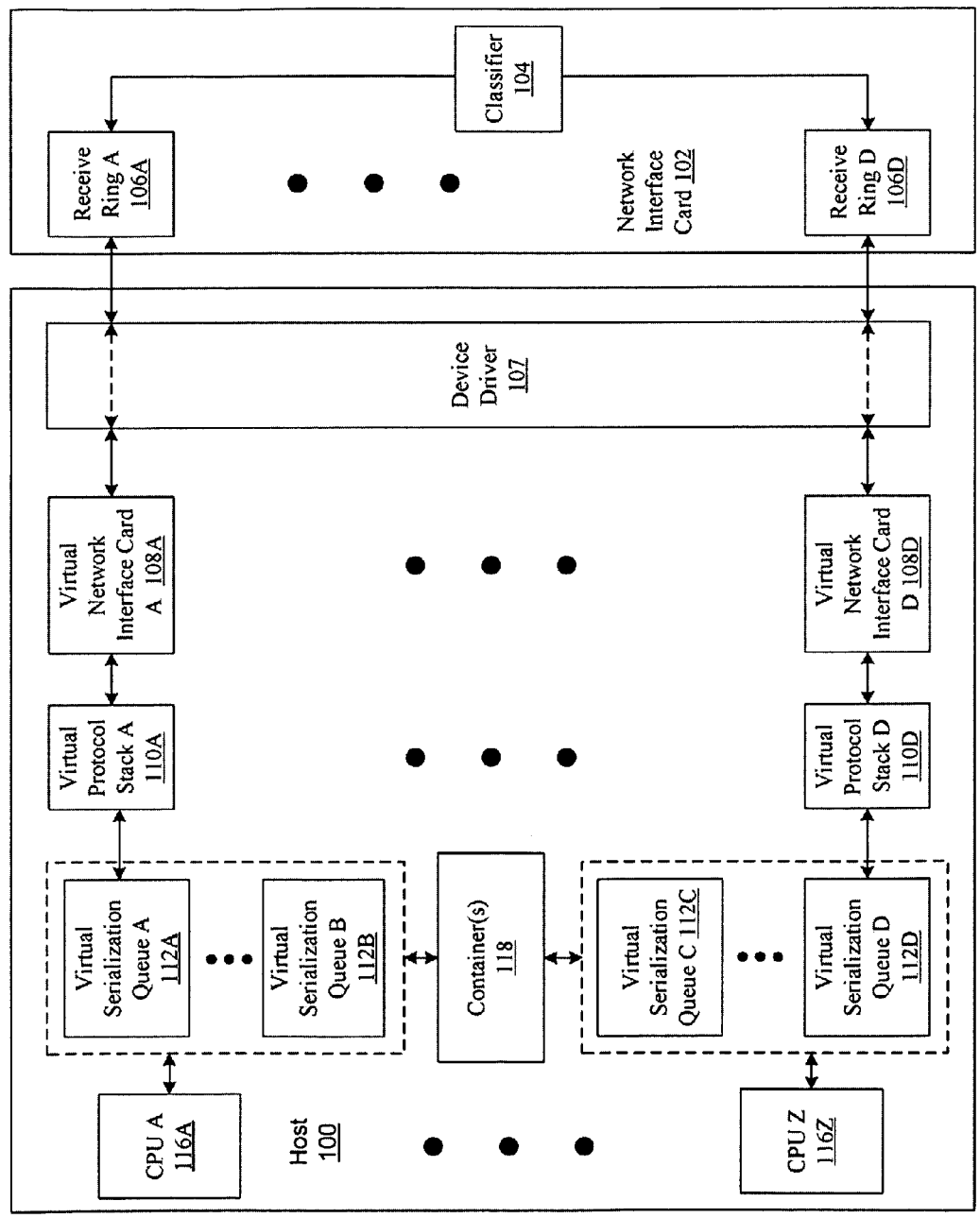
FIGS. 1A and 1B show a system in accordance with one embodiment of the invention.

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and apparatus for enforcing resource utilization of a container. More specifically, embodiments of the invention relate to a method and apparatus for enforcing network resource utilization of a container.

FIG. 1A shows a system in accordance with one embodiment of the invention. As shown in FIG. 1A, the system includes a host (100) operatively connected to a NIC (102). The NIC (102) provides an interface between the host (100) and a network (not shown) (e.g., a local area network, a wide area network, a wireless network, etc.). More specifically, the NIC (102) includes a network interface (NI) (i.e., the hardware on the NIC used to interface with the network). For example, the NI may correspond to an RJ-45 connector, a wireless antenna, etc. The packets received by the NI are then forwarded to other components on the NIC (102) for processing. In one embodiment of the invention, the NIC (102) includes a classifier (104) and one or more receive rings (106A, 106D). In one embodiment of the invention, the receive rings (106A, 106D) correspond to portions of memory within the NIC (102) used to temporarily store the received packets. Further, in one embodiment of the invention, a ring element of the receive rings (106A, 106D) may point to host memory. In one embodiment of the invention, the classifier (104) is configured to analyze the incoming network traffic, typically in the form of packets, received from the network (not shown).

In one embodiment of the invention, analyzing individual packets includes determining to which of the receive rings (106A, 106D) each packet is forwarded. In one embodiment of the invention, analyzing the packets by the classifier (104) includes analyzing one or more fields in each of the packets to determine to which of the receive rings (106A, 106D) the packets are forwarded. As an alternative, the classifier (104) may use the contents of one or more fields in each packet as an index into a data structure that includes information necessary to determine to which receive ring (106A, 106D) that packet is forwarded. The classifier (104) may be implemented entirely in hardware (i.e., the classifier (104) may be a separate microprocessor embedded on the NIC (102)). Alternatively, the classifier (104) may be implemented in software stored in memory (e.g., firmware, etc.) on the NIC and executed by a microprocessor on the NIC (102).

In one embodiment of the invention, the host (100) may include the following components: a device driver (107), one or more virtual NICs (108A, 108D), one or more virtual protocol stacks (110A, 110D), one or more virtual serialization queues (112A, 112B, 112C, 112D), one or more CPUs (116A, 116Z), and one or more containers (118). In one embodiment of the invention, the device driver (107) provides an interface between the receive rings (106A, 106D) and the host (100). More specifically, the device driver (107) exposes the receive rings (106A, 106D) to the host (100). In one embodiment of the invention, each of the virtual NICs (108A, 108D) is associated with one or more receive rings (106A, 106D). The virtual NICs (108A, 108D) provide an abstraction layer between the NIC (102) and the various containers (118) executing on the host (100). More specifically, each virtual NIC (108A, 108D) operates like a NIC (100). For example, in one embodiment of the invention, each virtual NIC (108A, 108D) is associated with one or more Internet Protocol (IP) addresses, one or more ports, and configured to handle one or more protocol types. Thus, while the host (100) may be operatively connected to a single NIC (102), containers (118) executing on the host (100)) operate as if the host (100) is bound to multiple NICs.

Each of the virtual NICs (108A, 108D) is operatively connected to a corresponding virtual protocol stack (110A, 110D). In one embodiment of the invention, each virtual protocol stack (110A, 110D) includes functionality to process packets in accordance with various protocols used to send and receive packets (e.g., Transmission Communication Protocol (TCP), Internet Protocol (IP), User Datagram Protocol (UDP), etc.). Further, each virtual protocol stack (110A, 110D) may also include functionality, as needed, to perform additional processing on the incoming and outgoing packets. This additional processing may include, but is not limited to, cryptographic processing, firewall routing, etc.

In one embodiment of the invention, each virtual protocol stack (110A, 110D) includes network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.).

In one embodiment of the invention, each virtual protocol stack (e.g., Virtual Protocol Stack A (110A), Virtual Protocol Stack D (110D)) is associated with a virtual serialization queue (e.g., Virtual Serialization Queue A (112A), Virtual Serialization Queue A (112D), respectively). In one embodiment of the invention, each virtual serialization queue (112A, 112B, 112C, 112D) corresponds to a data structure having at least two queues, an inbound queue and an outbound queue. Each of the queues within the virtual serialization queues (112A, 112B, 112C, 112D) are typically implemented as first-in first-out (FIFO) queues. Further, each virtual serialization queue (112A, 112B, 112C, 112D) is configured to send and receive packets from an associated virtual NIC (108A, 108D) via an associated virtual protocol stack (110A, 110D). In addition, each virtual serialization queue (112A, 112B, 112C, 112D) is configured to send and receive packets from one or more associated containers (118). The structure of the virtual serialization queue (112A, 112B, 112C, 112D) is discussed below in detail and shown in FIG. 3.

As discussed above, the host (100) may include one or more CPUs (116A, 116Z). Further, each virtual serialization queue (112A, 112B, 112C, 112D) is bound to one of the CPUs (116A, 116Z). As shown in FIG. 1A, a pair of virtual serialization queues (e.g., Virtual Serialization Queue A (112A) and Virtual Serialization Queue B (112B)) is bound to one CPU (e.g., CPU A (116A)). Although FIG. 1A shows a pair of virtual serialization queues bound to a single CPU, those skilled in the art will appreciate that any number of virtual serialization queues may be bound to a CPU.

Figure 1B:
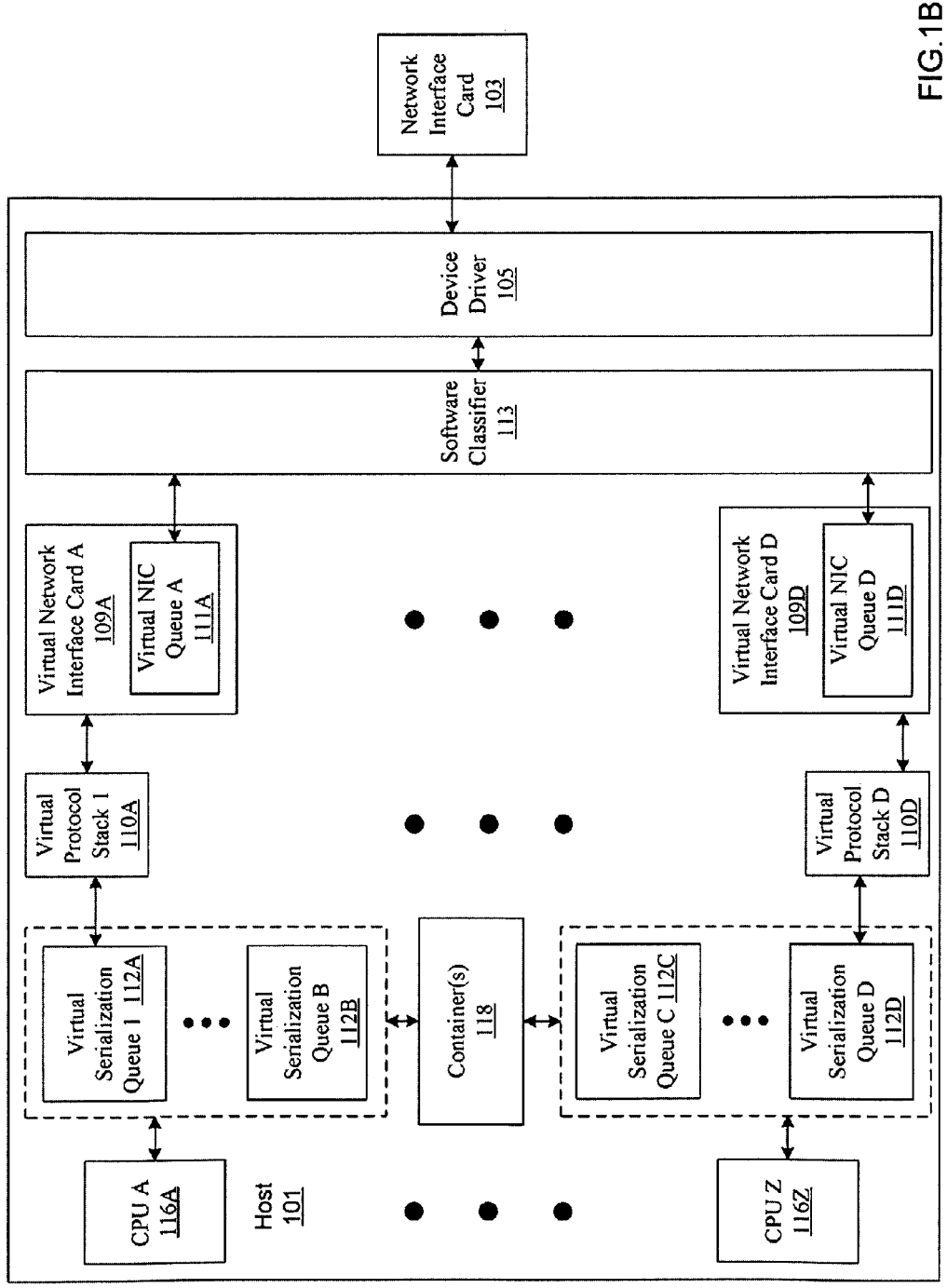

FIG. 1B shows a system in accordance with another embodiment of the invention. As shown in FIG. 1B, the system includes a host (101) operatively connected to a NIC (103). The NIC (103) provides an interface between the host (101) and a network (not shown) (e.g., a local area network, a wide area network, a wireless network, etc.). More specifically, the NIC (102) includes an NI (i.e., the hardware on the NIC used to interface with the network). For example, the NI may correspond to an RJ-45 connector, a wireless antenna, etc. The packets received by the NI are then forwarded to other components on the NIC (103) for processing, etc.

In one embodiment of the invention, the host (101) may include the following components: a device driver (105), a software classifier (113), one or more virtual NICs (109A, 109D), one or more virtual protocol stacks (110A, 110D), one or more virtual serialization queues (112A, 112B, 112C, 112D), one or more CPUs (116A, 116Z), and one or more containers (118). In one embodiment of the invention, the software classifier (113) is configured to analyze the incoming network traffic, typically in the form of packets, received from the network (not shown).

In one embodiment of the invention, the purpose of classifying the packets is to determine to which of the virtual NIC queues (111A, 111D) each of the packets is forwarded. In one embodiment of the invention, the virtual NIC queues (111A, 111D) correspond to portions of memory (e.g., buffers) within the host (101) used to temporarily store packets. In one embodiment of the invention, analyzing the packets by the software classifier (113) includes analyzing one or more fields in the packet to determine to which of the virtual NIC queues (111A, 111D) each of the packets is forwarded. As an alternative, the software classifier (113) may use the contents of one or more fields in each packet as an index into a data structure that includes information necessary to determine which virtual NIC queue (111A, 111D) each of the packets is forwarded.

As shown in FIG. 1B, the device driver (105) is operatively connected to the software classifier (113) and provides an interface between the NIC (103) and the host (101). In one embodiment of the invention, each of the virtual NICs (109A, 109D) includes one or more virtual NIC queues (111A, 111D). The virtual NICs (109A, 109D) provide an abstraction layer between the NIC (103) and the various containers (118) executing on the host (101). More specifically, each virtual NIC (109A, 109D) operates like a NIC (101). For example, in one embodiment of the invention, each virtual NIC (109A, 109D) is associated with one or more Internet Protocol (IP) addresses, one or more ports, and configured to handle one or more protocol types. Thus, while the host (101) may be operatively connected to a single NIC (103), the host (101) (or more specifically, containers (118) executing on the host (101)) operate as if the host (101) is bound to multiple NICs.

Each of the virtual NICs (109A, 109D) is operatively connected to a corresponding virtual protocol stack (110A, 110D). In one embodiment of the invention, each virtual protocol stack (110A, 110D) includes functionality to process packets in accordance with various protocols used to send and receive packets (e.g., TCP, IP, UDP, etc.). Further, each virtual protocol stack (110A, 110D) may also include functionality, as needed, to perform additional processing on the incoming and outgoing packets. This additional processing may include, but is not limited to, cryptographic processing, firewall routing, etc.

In one embodiment of the invention, each virtual protocol stack (110A, 110D) includes network layer and transport layer functionality. In one embodiment of the invention, network layer functionality corresponds to functionality to manage packet addressing and delivery on a network (e.g., functionality to support ARP, Internet Control Message Protocol, etc.). In one embodiment of the invention, transport layer functionality corresponds to functionality to manage the transfer of packets on the network (e.g., functionality to support TCP, UDP, SCTP, etc.).

In one embodiment of the invention, each virtual protocol stack (e.g., Virtual Protocol Stack A (110A), Virtual Protocol Stack D (110D)) is associated with a virtual serialization queue (e.g., Virtual Serialization Queue A (112A), Virtual Serialization Queue A (112D), respectively). In one embodiment of the invention, each virtual serialization queue (112A, 112B, 112C, 112D) corresponds to a data structure having at least two queues, an inbound queue and an outbound queue. Each of the queues within the virtual serialization queues (112A, 112B, 112C, 112D) are typically implemented as first-in first-out (FIFO) queues. Further, each virtual serialization queue (112A, 112B, 112C, 112D) is configured to send and receive packets from associated virtual NICs (109A, 109D) via an associated virtual protocol stack (110A, 110D). In addition, each virtual serialization queue (112A, 112B, 112C, 112D) is configured to send and receive packets from one or more associated containers (118). The structure of the virtual serialization queue (112A, 112B, 112C, 112D) is discussed below in detail and shown in FIG. 3. As discussed above, the host (101) may include one or more CPUs (116A, 116Z). Further, each virtual serialization queue (112A, 112B, 112C, 112D) is bound to one of the CPUs (116A, 116Z). As shown in FIG. 1B, a pair of virtual serialization queues (e.g., Virtual Serialization Queue A (112A) and Virtual Serialization Queue B (112B)) is bound to one CPU (e.g., CPU A (116A)). Although FIG. 1A shows a pair of virtual serialization queues bound to a single CPU, those skilled in the art will appreciate that any number of virtual serialization queues may be bound to a CPU.

As discussed above, in FIGS. 1 and 2 the host (100, 101) includes one or more containers (118). In one or more embodiments of the invention, each container (118) provides an isolated environment for running applications. Processes running in a given container are prevented from monitoring or interfering with other activities in the system. Access to other processes, network interfaces, file systems, devices, and inter-process communication facilities is restricted to prevent interaction between processes in different container. The privileges available within a container are restricted to prevent operations with system-wide impact.

In one embodiment of the invention, each container (118) may include functionality to support the following processes: per-container console, system log, packaging database, run level, identity (including name services), inter-process communication facility, etc. In addition, the host (100, 101) may include a set of administrative tools to manage the containers (118), allowing them to be configured, installed, patched, upgraded, booted, rebooted, and halted. As a result, containers (118) may be administered in a manner very similar to separate machines.

In one embodiment of the invention, a container (118) may either be bound to a dedicated pool of resources (such as a number of CPUs, a quantity of physical memory, network resources), or can share resources with other containers (118) according to defined proportions. This allows the use of container both on large systems (where dedicated resources may be most appropriate) and smaller ones (where a greater degree of sharing is necessary). Further, containers (118) also provide for the delegation of many of the expected administrative controls for using containers (118). For example, because each container has its own name service identity, it also has its own notion of a password file and its own root user.

In one embodiment of the invention, the host (100, 101) includes a global container and one or more non-global containers, where each container is identified by an alphanumeric name and a numeric ID. The global container may include one or more non-global containers. The global container always exists, and acts as the "default" container in which all processes run if no other non-global containers have been created. Further, in one or more embodiments of the invention, the global container is the general operating environment (OS) that is created when the OS is booted and executed, and serves as the default container in which processes may be executed if no non-global containers are created/present. In the global container, administrators and/or processes having the proper rights and privileges may perform generally any task and access any device/resource that is available on the host (100, 101) on which the OS is run. Thus, processes running in the global container typically have the same set of privileges available on a host (100, 101) running without containers, i.e., privileges to load kernel modules, access physical devices, etc. Further, an administrator logged into the global container may monitor and control the host (100, 101) as a whole (including the physical devices and network interface that are hidden from the other non-global containers).

One implementation of containers (118) is Solaris™ Containers developed and distributed by Sun Microsystems, Inc. Those skilled in the art will appreciate that the invention is not limited to the Solaris™ Containers implementation but may be used with any implementation of containers that includes the above functionality.

Continuing with the discussion of embodiments of the invention, in one embodiment of the invention, the receive rings and the virtual NIC queues may be generally referred to as temporary data structures. Further, in one embodiment of the invention, a system, as shown in FIGS. 1A and 1B, may include multiple hosts (such as host (100) in FIG. 1A and host (101) in FIG. 1B where each host is operatively connected to one or more NICs. In one embodiment of the invention, each of the NICs may correspond to the NIC shown in FIG. 1A (i.e., NIC (102)) or the NIC shown in FIG. 1B (i.e., NIC (103)). Thus, in a given system, one host may include a software classifier while another host may be connected to a NIC with a hardware classifier. In this scenario, the host would be configured to support both implementations, as described above with in FIGS. 1A and 1B

Figure 2:
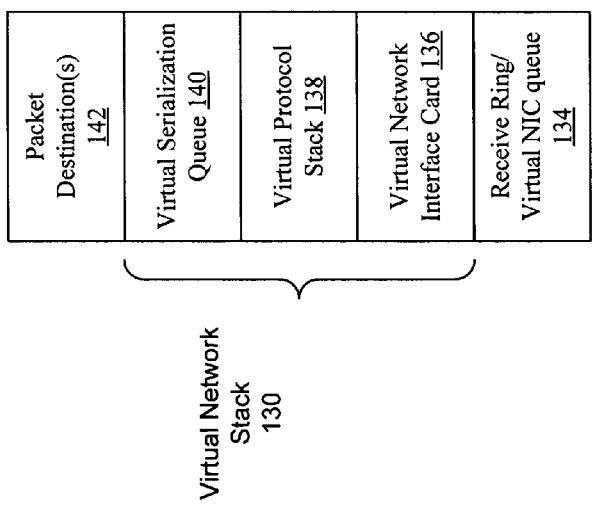
FIG. 2 shows a virtual network stack in accordance with one embodiment of the invention.

FIG. 2 shows a virtual network stack in accordance with one embodiment of the invention. Various components described above in FIG. 1A and FIG. 1B may be collectively referred to as a virtual network stack (130). In one embodiment of the invention, the virtual network stack (130) includes a virtual NIC (136), a virtual protocol stack (138), and a virtual serialization queue (140). In one embodiment of the invention, the virtual network stack (130) may be bound to one or more receive rings or virtual NIC interfaces (134) (depending on the implementation). Further, the virtual network stack (130) may be bound to one or more containers (142). All of the aforementioned components in the virtual network stack (130) are bound together such that a packet received by the virtual NIC (136) of a particular virtual network stack (130) is forwarded through the other components of the virtual network stack (130) until the packet reaches the container (142)) associated with the particular virtual network stack (130). In one embodiment of the invention, the host includes multiple virtual network stacks (130) each of which includes a virtual NIC (136), a virtual protocol stack (138), and a virtual serialization queue (140).

Figure 3:
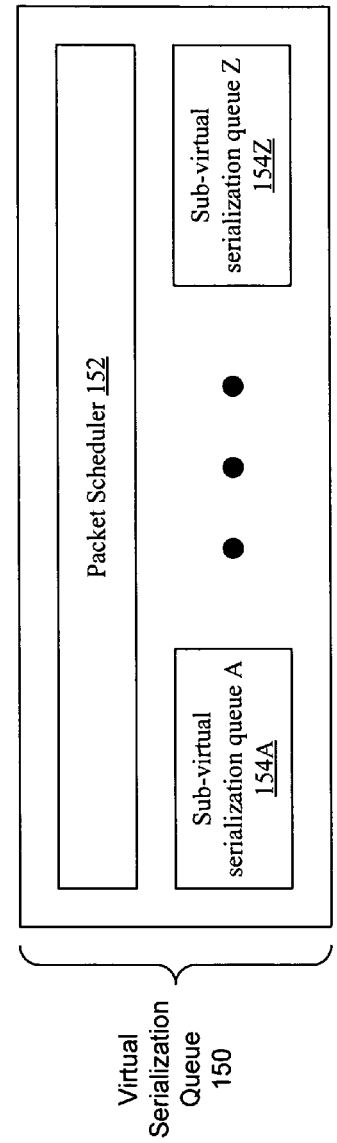
FIG. 3 shows a virtual serialization queue in accordance with one embodiment of the invention.

FIG. 3 shows a virtual serialization queue in accordance with one embodiment of the invention. In one embodiment of the invention, the virtual serialization queue (150) includes a packet scheduler (152) and one or more sub-virtual serialization queues (154A, 154Z). In one embodiment of the invention, each sub-virtual serialization queue (154A, 154Z) may be configured to queue specific types of packets. For example, the sub-virtual serialization queues (154A, 154Z) may be configured to queue received packets based on the protocol (e.g., IP Security Protocol (IPsec), TCP, IP, UDP, etc.) used to send the packet. Those skilled in the art will appreciate that each sub-virtual serialization queue (154A, 154Z) may be configured to queue any specified subset of packets. In one embodiment of the invention, if the virtual serialization queue (150) includes one or more sub-virtual serialization queues (154A, 154Z), then each of the sub-virtual serialization queues (154A, 154Z) is bound to the same CPU and associated with the same virtual network stack. Further, if the virtual serialization queue (150) includes one or more sub-virtual serialization queues (154A, 154Z), then the virtual network stack associated with the sub-virtual serialization queues (154A, 154Z) is also associated with a corresponding number of receive rings and/or virtual NIC queues (depending on the implementation). Thus, each of the sub-virtual serialization queues (154A, 154Z) is bound to one of the aforementioned receive rings and/or virtual NIC queues (depending on the implementation). Thus, when the virtual serialization queue (150) receives packets from one or more associated receive rings or a virtual NIC queues (not shown) (depending on the implementation) via the associated virtual network stack, the virtual serialization queue (150) places the packets in the appropriate sub-virtual serialization queue (154A, 154Z) based on which receive ring or virtual NIC queue the packets were received from. In one embodiment of the invention, each of the sub-virtual serialization queues (154A, 154Z) includes a pair of FIFO queues, namely an inbound queue and an outbound queue.

Those skilled in the art will appreciate that a virtual serialization queue (150) does not necessarily include any sub-virtual serialization queues (154A, 154Z). If the virtual serialization queue (150) does not include any sub-virtual serialization queues (154A, 154Z), then the virtual serialization queue (150) may include only a single pair of queues.

In one embodiment of the invention, the packet scheduler (152) is configured to process the packets stored in each of the sub-virtual serialization queues (154A, 154Z). More specifically, the packet scheduler (152) schedules how packets queued in the various sub-virtual serialization queues (154A, 154Z) are to be processed (i.e., the order of processing of those packets, etc.). In one embodiment of the invention, the packet scheduler (150) may include functionality to support both fair-share scheduling and time-sharing scheduling with respect to processing of the packets queued on the sub-virtual serialization queues (154A, 154Z). Further, the packet scheduler (150) may also be configured to schedule packet processing based on the priority associated with each of the sub-virtual serialization queues (154A, 154Z).

Figure 4:
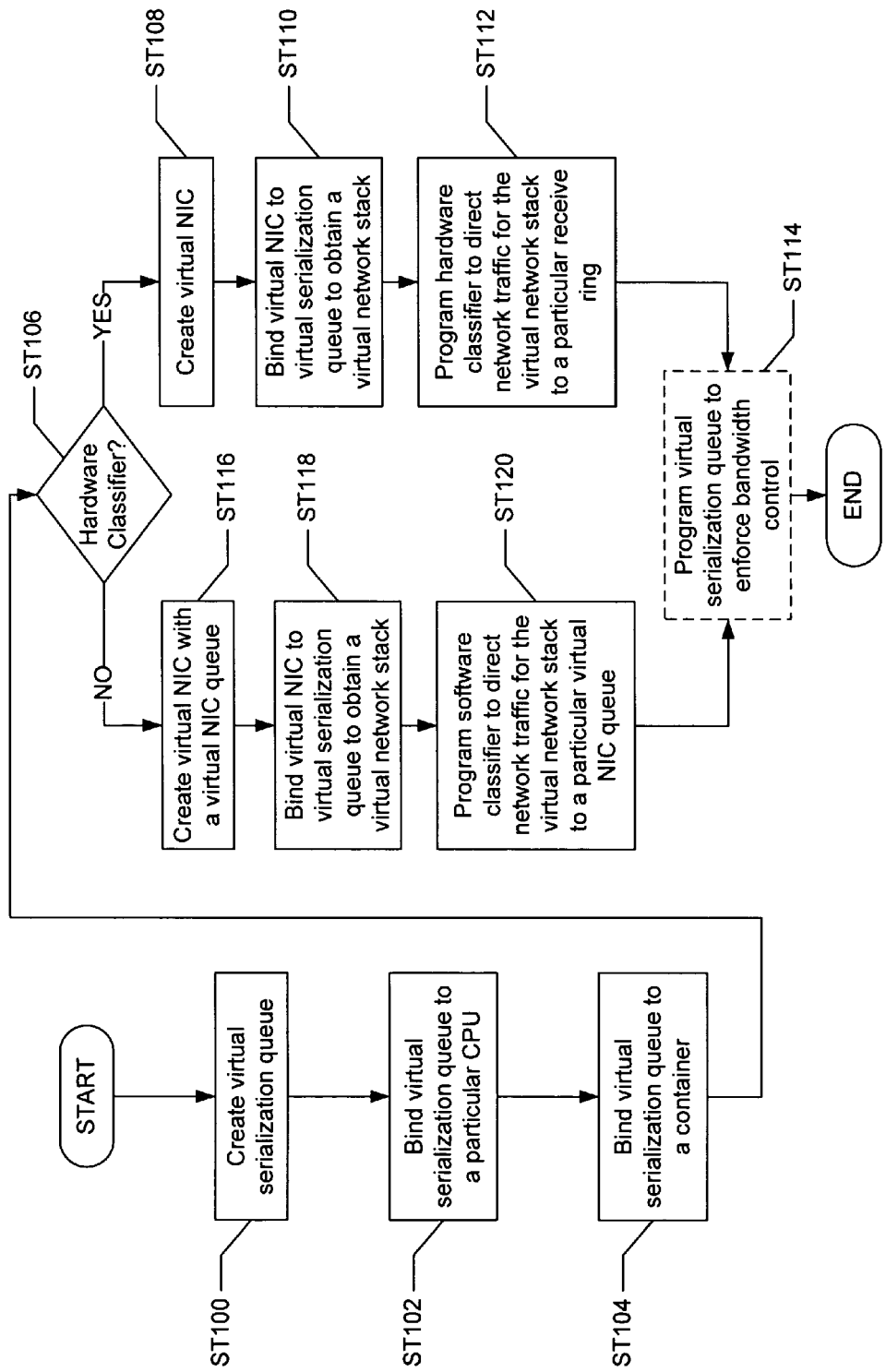
FIG. 4 shows a flowchart in accordance with one embodiment of the invention.

FIG. 4 shows a flowchart in accordance with one embodiment of the invention. Initially, a virtual serialization queue is created (ST100). In one embodiment of the invention, creating the virtual serialization queue may include specifying one or more sub-virtual serialization queues and configuring the packet scheduler. The virtual serialization queue is subsequently bound to a CPU on the host (ST102). Those skilled in the art will appreciate that the virtual serialization queue created in ST100 may be implicitly bound to a CPU upon creation.

At this stage, the virtual serialization queue is bound to a container (ST104). Those of ordinary skill in the art will appreciate that the container (118) may be bound to the virtual serialization queue any time after the virtual serialization queue has been created.

A determination is now made whether a NIC associated with the host includes a hardware classifier (ST106). If the NIC includes a hardware classifier, then a virtual NIC is created (ST108) and bound to the virtual serialization queue created in ST100 to obtain a virtual network stack (ST110). The hardware classifier is subsequently programmed so that network traffic for the virtual network stack created in ST110 is directed to a particular receive ring by the hardware classifier (ST112). The virtual serialization queue created in ST100 is programmed to enforce bandwidth control (ST114). In one embodiment of the invention, ST114 is optional. In one embodiment of the invention, programming the virtual serialization to enforce bandwidth control includes specifying a bandwidth control parameter for the virtual serialization queue. In one embodiment of the invention, the bandwidth control parameter specifies the maximum number of packets that may be processed by the virtual serialization queue over a specific time period (e.g., number of packets that may be processed by the specific virtual serialization queue per second). Alternatively, the bandwidth control parameter may specify the maximum number of bytes of data that may be processed by the virtual serialization queue in a specific time period.

Continuing the discussion of FIG. 4, if the NIC does not include a hardware classifier (i.e., the scenario in which the host includes a NIC having a software classifier), then a virtual NIC with a virtual NIC queue is created (ST116) and bound to the virtual serialization queue created in ST100 to obtain a virtual network stack (ST118). The software classifier is then programmed so that network traffic for the virtual network stack created in ST110 is directed to a particular virtual NIC queue by the software classifier (ST120). The method then proceeds to ST114.

Those skilled in the art will appreciate that the steps shown in FIG. 4 may be repeated as required to create any number of virtual network stacks. Once the virtual network stack(s) has been created, as described above, the host may proceed to receive packets from the network. Those skilled in the art will appreciate that the number of virtual network stacks created using the steps shown in FIG. 4 may vary based on the available system resources (e.g., number of CPUs, type of NIC, etc.)

Figure 5:
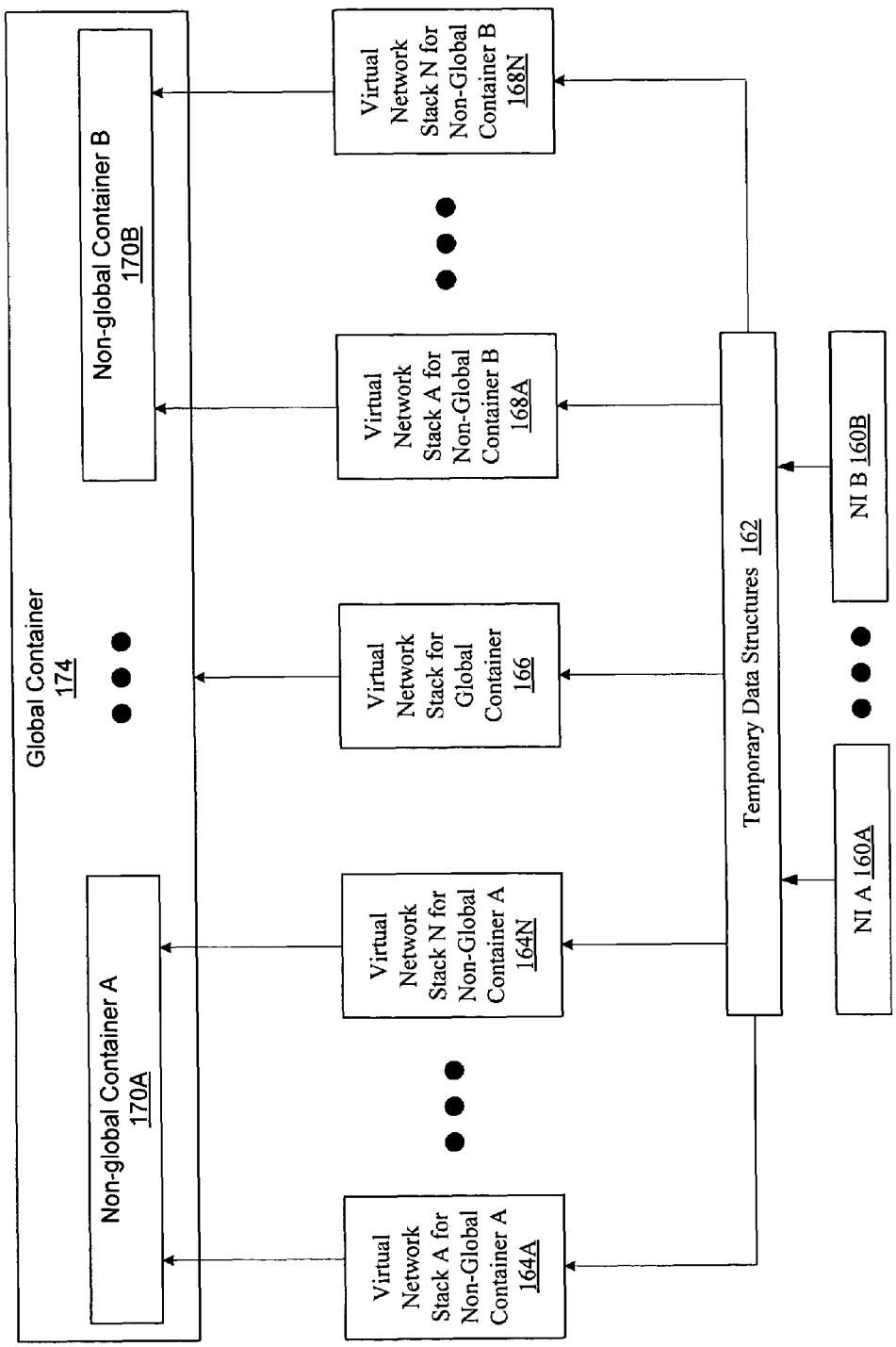
FIG. 5 shows an exemplary system in accordance with one embodiment of the invention.

FIG. 5 shows an exemplary system after the steps in FIG. 4 have been performed in accordance with one embodiment of the invention. The exemplary system is not intended to limit the scope of the invention. The system shown in FIG. 5, includes a number of network interfaces (NIs) (160A, 160B) operatively connected to temporary data structures (162). As discussed above, the temporary data structures (162) may correspond to receive rings or virtual NIC queues. Further, those skilled in the art will appreciate that, though not shown in FIG. 5, the NIs (160A, 160B) are associated with NICs. Continuing with the discussion of FIG. 5, the temporary data structures (162) are operatively connected to a number of virtual network stacks (164A, 164N, 166, 168A, 168N). Each of the virtual network stacks (164A, 164N, 166, 168A, 168N) is in turn associated with either a global container (174) or a non-global container (170A, 170B). As shown in FIG. 5, each non-global container (164, 166) may be associated with one or more virtual network stacks. Further, though not shown in FIG. 5, the global container (174) may also be associated with one or more virtual network stack.

When a packet arrives at one of the NIs (106A, 160B), the packet is processed by a classifier (either hardware or software) (not shown) and then forwarded to the appropriate temporary data structure (162). At this point, the packet remains in the temporary data structure until the packet is requested by the corresponding virtual network stack (164A, 164N, 166, 168A, 168N). If the virtual network stack is operating in polling mode (discussed below), then upon request, the packet is forward to the appropriate virtual network stack (164A, 164N, 166, 168A, 168N). The packet subsequently propagates up the virtual network stack (164A, 164N, 166, 168A, 168N) and eventually is forwarded to the associated global (174) or non-global (170A, 170B) container.

As a result of the above configuration, the amount of network resources used by a particular container (global or non-global) may be managed. Specifically, each of the virtual network stacks associated with a given container may also be associated with a bandwidth control parameter. Thus, only a certain number of packets may be processed by the virtual network stack(s) associated with a given container over a specific time period. In this manner, the amount of a given network resource (e.g., bandwidth, etc.) used by a particular container may be limited. Moreover, by limiting the number of packets that may be processed by the virtual network stack(s) associated with a given container, a given container may not be able to monopolize all the network resource allocated to a given system at the expense of other containers that may also need to use those network resources. In addition, by implementing a polling mode whereby packets are requested and subsequently pulled from the temporary data structure, the containers may continuously process packets without being overwhelmed by too many incoming packets.

In one embodiment of the invention, the above configuration allows the packets received for a given container (global or non-global) to be isolated from the packets received by the other containers (global or non-global) executing on the host. Further, the above configuration allows a user to allocate certain network resources to a container. For example, the user may allocate one or more NICs to a container or a portion of a NIC to a container.

Figure 6:
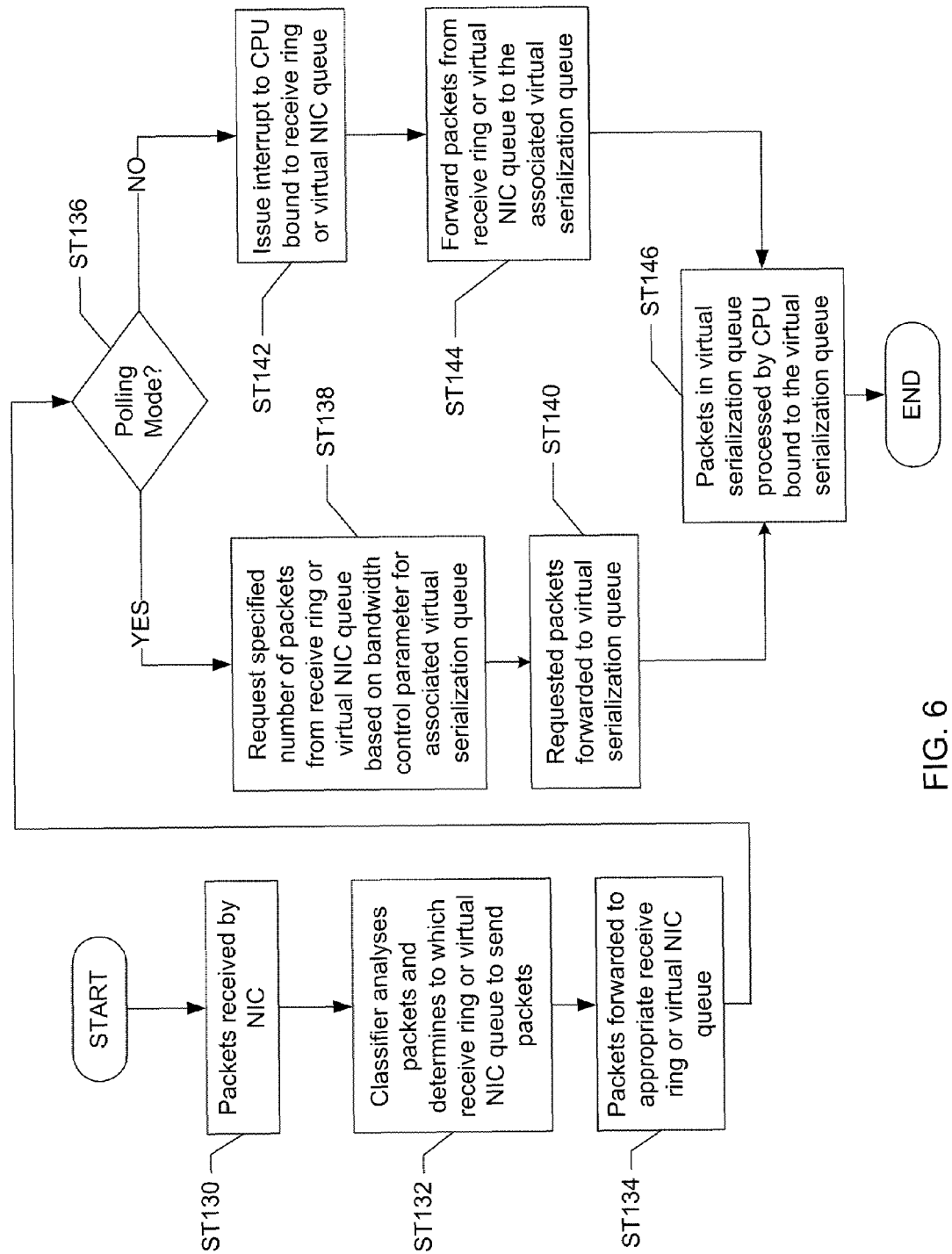
FIG. 6 shows a flowchart in accordance with one embodiment of the invention.

FIG. 6 shows a flowchart in accordance with one embodiment of the invention. Initially, one or more packets are received by the NIC (ST130). A classifier (either a hardware classifier residing in the NIC or a software classifier residing in the host operatively connected to the NIC) analyses each packet and determines which of the receive rings (if the classifier is a hardware classifier) or virtual NIC queues (if the classifier is a software classifier) to forward each of the packets (ST132). The packets are subsequently forwarded to the appropriate receive ring (if the classifier is a hardware classifier) or virtual NIC queue (if the classifier is a software classifier) as determined by the classifier (ST134). At this stage, the processing of the packets differs depending on which mode the virtual serialization queue (which is bound to the receive ring or virtual NIC queue via the stack) is operating in. Specifically, the processing of the packets depends on whether the virtual serialization queue is operating in polling mode or interrupt mode (ST136).

If the virtual serialization queue is operating in polling mode, then the packets remain in the receive ring or virtual NIC queue (depending on the implementation) until the virtual serialization queue requests a specified number of packets from the receive ring or virtual NIC queue based on the bandwidth control parameter (ST138). The requested number of packets is then forwarded to the virtual serialization queue (ST140). In one embodiment of the invention, the virtual serialization queue does not request any packets when there are packets already queued on the virtual serialization queue. Those skilled in the art will appreciate that the once the virtual serialization queue receives the packets from the receive ring or virtual NIC queue, the virtual serialization queue may place each of the packets in an appropriate sub-virtual serialization queue based on the results of the classifier analysis in ST132.

Those skilled in the art will appreciate the virtual serialization queue may operate in polling mode without utilizing a bandwidth control parameter. Thus, if no bandwidth control parameter is specified, then all packets for the particular virtual serialization queue are forwarded from the receive ring or virtual NIC queue to the virtual serialization queue each time the virtual serialization queue requests packets from the receive ring or virtual NIC queue. Those skilled in the art will appreciate that the receive rings and/or virtual NIC queues store a finite number of packets. Thus, if the receive rings and/or virtual NIC queues are receiving packets at a faster rate than the corresponding virtual serialization queue is requesting packets, the receive rings and/or virtual NIC queues fills with packets and packets received after this point are dropped until packets on the receive rings and/or virtual NIC queues are requested and processed.

Alternatively, if the virtual serialization queue is operating in interrupt mode, then an interrupt is issued to the CPU bound to the receive ring or virtual NIC queue (i.e., the CPU bound to the virtual serialization queue that is bound to the stack associated with the receive ring or virtual NIC queue) (ST142). When the interrupt is serviced, all packets in the receive ring or virtual NIC queue are forwarded to the virtual serialization queue (ST144).

Once the packets are placed on the virtual serialization queue, regardless of the mode in which the virtual serialization queue is operating, the packets are processed by the CPU bound to the particular virtual serialization queue (ST146). In one embodiment of the invention, the specific order in which the packets in a particular sub-virtual serialization queue are processed is determined by the packet scheduler.

An embodiment of the invention may be implemented on virtually any type of computer regardless of the platform being used. For example, as shown in FIG. 7, a networked computer system (200) includes a processor (202), associated memory (204), a storage device (206), and numerous other elements and functionalities typical of today's computers (not shown). The networked computer (200) may also include input means, such as a keyboard (208) and a mouse (210), and output means, such as a monitor (212). The networked computer system (200) is connected to a local area network (LAN) or a wide area network via a network interface connection (not shown). Those skilled in the art will appreciate that these input and output means may take other forms. Further, those skilled in the art will appreciate that one or more elements of the aforementioned computer (200) may be remotely located and connected to the other elements over a network. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for controlling resource utilization of containers, comprising:

associating each of a plurality of containers with one of a plurality of virtual network stacks, wherein the plurality of containers and the plurality of virtual network stacks are located in a host, wherein each of the plurality of containers comprises an isolated application execution environment, and wherein each one of the plurality of virtual network stacks comprises a virtual network interface card associated with a distinct Internet Protocol (IP) address;

receiving, at a physical network interface operatively connected to the host, a plurality of packets from a network;

analyzing each of the plurality of packets by a classifier to determine to which of a plurality of temporary data structures each of the plurality of packets is forwarded, wherein the classifier is operatively connected to the physical network interface;

forwarding each of the plurality of packets to one of the plurality of temporary data structures as determined by the classifier;

requesting a number of packets from the one of the plurality of temporary data structures by a virtual network stack of the plurality of virtual network stacks, wherein the virtual network stack is associated with the one of the plurality of temporary data structures, wherein the virtual network stack is associated with a container of the plurality of containers, and wherein the number of packets is limited by a bandwidth control parameter associated with the virtual network stack;

forwarding the number of packets to the virtual network stack;

processing the number of packets by the virtual network stack; and forwarding the number of packets to the container associated with the virtual network stack.

2. The method of claim 1, further comprising:

creating the plurality of virtual network stacks prior to receiving the plurality of packets from the network, wherein creating each of the plurality of virtual network stacks comprises:

creating a virtual serialization queue;

binding the virtual serialization queue to a central processing unit;

creating the virtual network interface card; and binding the virtual serialization queue to the virtual network interface card and a virtual protocol stack to obtain the virtual network stack.

3. The method of claim 1, wherein each of the plurality of containers is one selected from the group consisting of a non-global container and a global container.

4. The method of claim 1, wherein the virtual network stack processes the number of packets using a central processing unit bound to the virtual network stack.

5. The method of claim 1, wherein each of the plurality of temporary data structures comprises at least one selected from the group consisting of a virtual network interface card queue and a receive ring.

6. The method of claim 1, wherein the bandwidth control parameter specifies a maximum number of packets that may be requested from the one of the plurality of temporary data structures by the virtual network stack in a specified period of time.

7. The method of claim 1, wherein the classifier is one selected from the group consisting of a hardware classifier and a software classifier.

8. The method of claim 2, wherein the virtual serialization queue comprises at least one sub-virtual serialization queue and a packet scheduler.

9. A system, comprising:
    a physical network interface configured to receive a plurality of packets from a network;
    a classifier operatively connected to the physical network interface, wherein the classifier is configured to analyze each of the plurality of packets and determine to which of a plurality of temporary data structures each of the plurality of packets is forwarded; and
    a host, comprising:
        a plurality of containers wherein each of the plurality of containers comprises an isolated application execution environment;
        the plurality of temporary data structures configured to receive packets from the classifier, wherein each of the plurality of temporary data structures is associated with at least one of a plurality of virtual network stacks; and
        the plurality of virtual network stacks, wherein each of the plurality of virtual network stacks is associated with one of the plurality of containers, wherein at least one of the plurality of virtual network stacks is configured to retrieve and queue a number of packets from one of the plurality of temporary data structures associated with the at least one virtual network stack when the at least one virtual network stack is operating in polling mode, wherein the number of packets is limited by a bandwidth control parameter associated with the at least one virtual network stack, and wherein each of the plurality of virtual network stacks comprises a virtual network interface card associated with a distinct Internet Protocol (IP) address.

10. The system of claim 9, wherein each of the plurality of containers is at least one selected from the group consisting of a global container and a non-global container.

11. The system of claim 9, wherein each of the plurality of virtual network stacks further comprises a virtual protocol stack and a virtual serialization queue.

12. The system of claim 9, wherein the bandwidth control parameter specifies a maximum number of packets that may be requested from the one of the plurality of temporary data structures associated with the at least one virtual network stack in a specified period of time.

13. The system of claim 9, wherein each of the plurality of temporary data structures comprises at least one selected from the group consisting of a virtual network interface card queue and a receive ring.

14. The system of claim 9, wherein the classifier is one selected from the group consisting of a hardware classifier and a software classifier.

15. The system of claim 9, wherein the at least one virtual network stack comprises functionality to operate in polling mode and in interrupt mode.

16. The system of claim 11, wherein the at least one virtual serialization queue comprises at least one sub-virtual serialization queue and a packet scheduler.

17. A computer readable medium comprising software instructions for controlling resource utilization of containers, comprising software instructions executable to:
    associate each of a plurality of containers with a different one of a plurality of virtual network stacks, wherein the plurality of containers and the plurality of virtual network stacks are included in a host, wherein each of the plurality of containers comprises an isolated application execution environment, and wherein each one of the plurality of virtual network stacks comprises a virtual network interface card associated with a distinct Internet Protocol (IP) address;
    receive, at a physical network interface operatively connected to the host, a plurality of packets from a network;
    analyze each of the plurality of packets by a classifier to determine to which of a plurality of temporary data structures each of the plurality of packets is forwarded, wherein the classifier is operatively connected to the physical network interface;
    forward each of the plurality of packets to one of the plurality of temporary data structures as determined by the classifier;
    request a number of packets from the one of the plurality of temporary data structures by a virtual network stack of the plurality of virtual network stacks, wherein the virtual network stack is associated with the one of the plurality of temporary data structures, wherein the virtual network stack is associated with a container of the plurality of containers, and wherein the number of packets is limited by a bandwidth control parameter associated with the virtual network stack;
    forward the number of packets to the virtual network stack;
    processing the number of packets by the virtual network stack; and
    forwarding the number of packets to the container associated with the virtual network stack.

18. The computer readable medium of claim 17, wherein each of the plurality of containers is one selected from the group consisting of a non-global container and a global container.

* * * * *